United States Patent [19]

Krause

[11] 3,900,771

[45] Aug. 19, 1975

[54] TRANSISTOR WITH HIGH CURRENT DENSITY

[75] Inventor: Gerhard Krause, Ebersberg, Germany

[73] Assignee: Siemens Aktiengesellschaft, Erlangen, Germany

[22] Filed: July 30, 1973

[21] Appl. No.: 383,792

Related U.S. Application Data

[63] Continuation of Ser. No. 198,313, Nov. 12, 1971, abandoned.

[30] Foreign Application Priority Data

Nov. 25, 1970 Germany .......................... 2058070

[52] U.S. Cl. .........357/7; 357/38; 357/89; 357/63; 357/36

[51] Int. Cl. ....................................H01l 11/00

[58] Field of Search... 317/235 Z, 235 AB, 235 AA, 239 AM, 239 AQ

[56] References Cited

UNITED STATES PATENTS 3,504,242 3/1970 Woolley .............................. 317/235

*Primary Examiner*—Martin H. Edlow

*Attorney, Agent, or Firm*—Herbert L. Lerner

[57] ABSTRACT

A continuously controllable transistor in which the ratio of the current of charged particles of one conductivity type, from the base of the collector, to the current of charged particles of the other conductivity type, from the collector to the base, is approximately equal to the ratio of the drift velocities of the particles of the one and the other conductivity type in the collector-base barrier layer. This transistor exhibits high current density.

9 Claims, 3 Drawing Figures

TRANSISTOR WITH HIGH CURRENT DENSITY

This is a continuation of application Ser. No. 198,313, filed Nov. 12, 1971 and now abandoned.

The present invention concerns a continuously controllable transistor, consisting of a first emitter, a second emitter, a base and a collector, with increased current density in the collector-base barrier layer.

In conventional transistors, the maximum current density $i$ in the collector-base space charge zone is approximately $i = v_s e N$, where $v_s$ is the saturation velocity of the charge carriers in the space charge zone, $e$ the electron charge and $N$ the doping concentration in the weakly doped region of the space charge zone. The higher the required reverse voltage, the smaller $N$ is and therefore also the maximally attainable current density. If the current density is increased beyond this value, the base expands, while the upper frequency limit and the current gain of the transistor drop. Furthermore, the field strength at the end near the collector side of the space charge zone increases. This can lead to a breakdown, particularly in the case of reactive loads. To be capable of controlling a predetermined current for a given reverse voltage, a conventional transistor must have a relatively large crystal area. This results in large dimensions and high manufacturing costs. Also, the maximum power attainable with a transistor is thereby limited, as crystals of any desired size cannot be manufactured.

If the transistor is used in wideband amplifiers with lowpass or bandpass characteristic, the output and input capacitance, which increases with the area, limits the maximum attainable bandwidth. These capacitances are furthermore non-linearly dependent on the voltage. In transmitter amplifiers this leads to undesired intermodulation products. The larger these capacitances, are the larger is the crystal area.

In all cases where the continuous wave power loss does not limit the current density, which applies particularly to pulse modulated transmitters and to switching applications, an increase of the current density in the collector-base barrier layer would avoid the shortcomings mentioned above.

It is, therefore, an object of the present invention to provide a transistor with increased current density in the collector-base barrier layer.

According to the invention, this result is achieved by providing in a transistor a ratio of the current of charged particles of the one conductivity type ($i_1$), from the base to the collector, to the current of charged particles of the other conductivity type ($i_2$), from the collector to the base, approximately equal to the ratio of the drift velocities of the particles of the one conductivity type and the other conductivity type in the collector-base barrier layer.

The transistor, of the present invention, exhibits increased current density in comparison to known transistors. Having small capacitances and small crystal areas, it is suited for high peak power. Furthermore, its switching times are short.

A further development of the invention consists in the feature that internal regulation exists in the transistor, which has the effect that the ratio of the two currents ($i_1$, $i_2$) is approximately equal to the ratio of the drift velocities of the one and the other conductivity type.

Further features and details of the invention will be seen from the following description of examples of embodiments with reference to the Figures, where:

Figure 1:
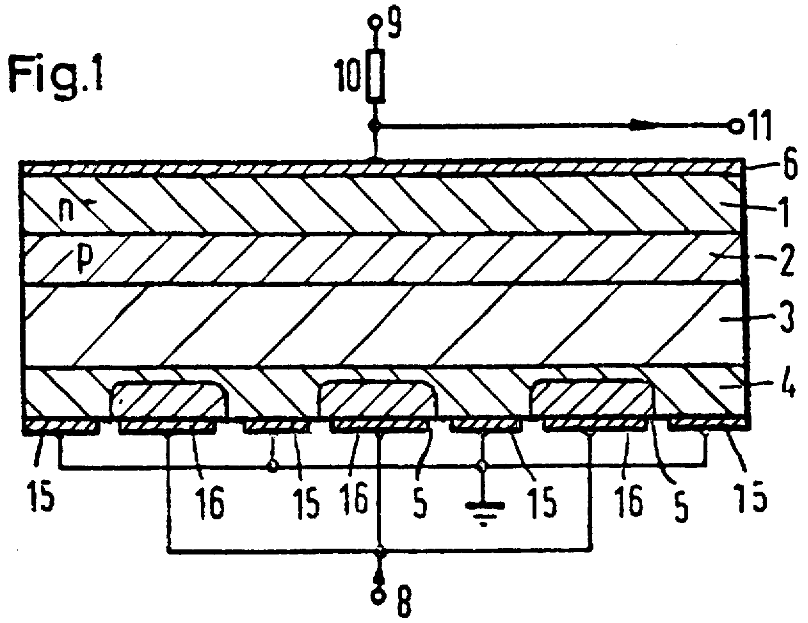
FIG. 1 shows, in cross section, a transistor.

In the transistor of FIG. 1, emitter 1 has $n+$ doping while base 2 has $p$ doping. The weakly $n$-doped zone of the collector 3, and the more heavily $n$-doped collector layer 4, sequentially follow. In addition to these zones known from conventional transistors, a further layer 5 is provided. This layer 5 is heavily $p$-doped. The currents are fed to the individual layers via the metallic layers 6, 15 and 16.

The collector is at ground potential. The transistor is controlled via the layer 5. It emits holes into the collector layer 4. This layer 5 will be called the control emitter in the following description in order to distinguish it from the emitter 1. When in operation as a continuously controllable amplifier, the control emitter 5 is connected to a small DC voltage, for instance, 0.8 V. Superimposed onto this voltage is the signal to be amplified, which signal is fed in via the terminal 8. A hole current is emitted from the control emitter 5 into the collector layer 4. Most of the holes diffuse through the almost field-free collector layer 4 into the charge draining field of the collector 3. They are drawn to the base 2 and increase the potential thereof. This potential rise causes electron injection from the emitter 1 into the base 2. Most of the electrons diffuse through the base 2 into the collector space charge zone of the collector 3.

It is essential that the numerical density of the electrons in the collector space charge zone approximately equals the numerical density of the holes in this region. To this end, it is necessary that the ratio of the hole current $i_2$ to $i_1$ is:

$$i_2/i_1 = V_2/V_2 \quad (1)$$

where $V_2$ is the drift velocity of the holes and $V_1$ the drift velocity of the electrons in this space charge zone.

The electrons now arrive in the collector layer 4 and then, via the metallic layer 15, to ground potential. The voltage drop of the electron current at the resistance of the collector layer 4 has the tendency to increase the control current. It is important that the resistance and thereby the feedback through the electron current is so small that the transistor does not have unstable behavior in the region of the characteristic used. To this end, it is necessary that the change of the voltage drop, due to the electron current in the effective resistance, is smaller than the control voltage change which released this electron current. In practice, one will make this resistance much smaller than corresponds to this extreme condition. The collector resistance is so low that the collector current released by the control voltage produces, at the collector resistance, a voltage drop which is smaller than this control voltage, and preferably one-third of the latter.

In principle, the stability condition can be met also by increasing the resistances, possibly also with reactances, in the control circuit, but only at the expense of the power gain. On the other hand, the power gain can be increased by inserting a reactance between the collector layer 4 and ground potential, but only at the expense of the critical frequency.

The far reaching compensation of the charges of the charge carriers in the space charge zone prevents the base 2 from expanding in the direction to the collector 3 for large current densities, and thereby from reducing the critical frequency of the transistor. Furthermore, the field strength increase caused thereby is avoided. The current density in the transistor can thereby be increased to several times that attainable in conventional transistor structures. The charge compensation need not be exact. The condition is that the potential difference caused by the uncompensated charges is smaller than the absolute magnitude of the operating voltage U.

Therefore, we have $$|U| > \frac{e}{\epsilon_1 \epsilon_0} \int_0^x \int_0^x (n_e - n_1 - ND)\, dx^2, \qquad \text{(II)}$$

wherein $e$ = charge of the electron;

$\epsilon_1 \epsilon_0$ = the absolute and relative dielectric constant;

$n_e$ = the numerical density of the electrons in the space charge zone;

$n_1$ = the numerical density of the holes in the space charge region; and $N_D$ = the donor concentration in the space charge region.

The integration is to be carried out over the width $x$ of the space charge zone.

The sum of the two currents $i_1$ and $i_2$ flows through the external resistor 10. The amplified output signal is taken off at the terminal 11. The negative supply voltage U is fed in at the terminal 9.

It is unusual that the output signal is taken off at the emitter 1. Nevertheless, the arrangement does not behave like a collector circuit with a conventional transistor, but resembles a base circuit. The input resistance and the capacitive feedback are low. The current gain $\alpha$, however, is larger than 1. Considering the different mobilities of electrons and holes, one obtains a current gain $\alpha$ of approximately 2.5 for silicon.

The advantages of the transistor, according to the invention, can be utilized only if the conditions of Equations (I) and (II) are fulfilled.

Figure 2:
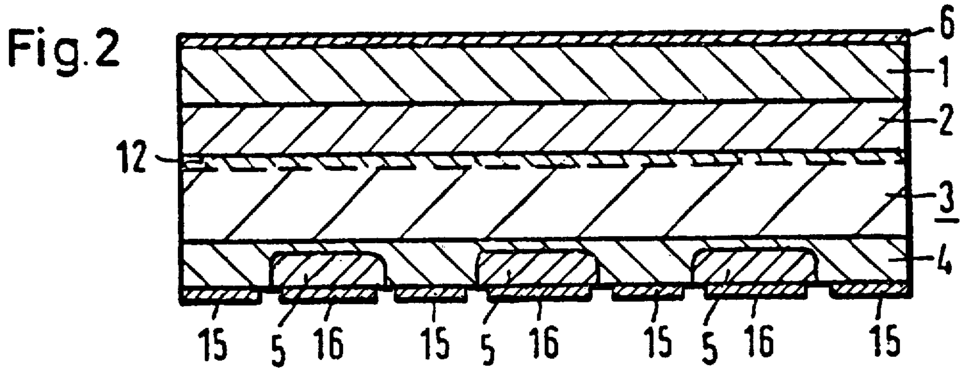
FIG. 2, shows, in cross section, a transistor with automatic charge carrier compensation in the collector-base barrier layer.

FIG. 2 shows a transistor, according to the invention, in which internal regulation is effective, so that these conditions are adjusted automatically in an advantageous manner. For this purpose, the current gain $\beta$ of the "transistor" formed by the base 2, the collector 3 and the collector layer 4, is given by:

$$\beta > V_1/V_2. \qquad \text{(III)}$$

The effect of an additional recombination zone 12 is not taken into consideration in Equation (III).

The $n$-doped recombination zone 12 with a high density of recombination centers is introduced into the weakly doped collector 3 at the base end thereof. If the electron current is too high, the base 2 expands. A part of the recombination zone 12, thereby, becomes field-free. The charge carriers move in this region through diffusion. Their dwell time and, therefore, the recombination probability in the recombination zone 12, which has a weak or no field, becomes larger. The larger the electron current excess, the wider the field-free region in the recombination zone 12 becomes. The equilibrium adjusts itself if Equation (I) is fulfilled. The recombination centers are introduced in practice while epitaxially growing the layer 12.

Figure 3:
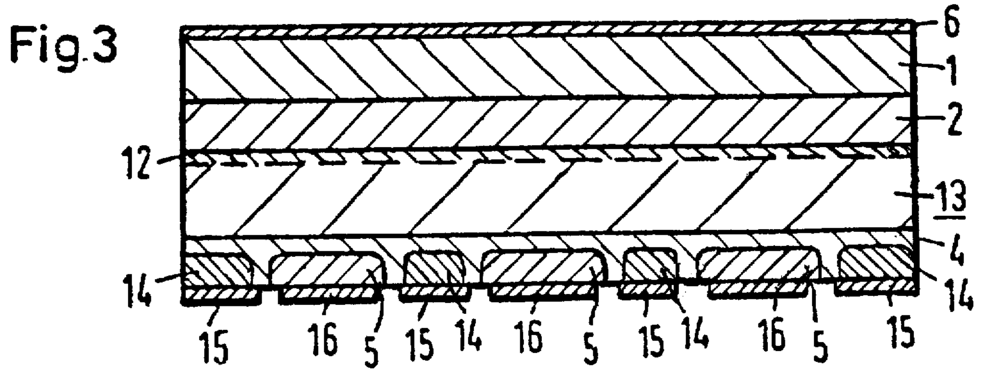
FIG. 3 shows, in cross section, a transistor in which the collector-base voltage is predominantly collected in the base-space charge zone.

In FIG. 3, instead of collecting the reverse voltage, in the weakly $n$-doped collector layer 4, the voltage is collected in a weakly $p$-doped zone 13. The recombination zone 12 is here situated in FIG. 3 in a weakly $p$-doped zone 13. Furthermore, the recombination zone can also extend over the boundary between a weakly $n$-doped and a weakly $p$-doped region. In FIG. 3, the heavily $n+$-doped regions 14 are introduced into the collector layer 4. They reduce the collector resistance.

The transit frequency $f_T$ of the novel transistor is approximately equal to the transit frequency of a conventional transistor. In such a comparison, it should be noted that the thickness of the base 2 can be very small, as the base path resistance has no disturbing effect. It should also be noted that because of the induced current, the emitter 1 starts to emit even before the holes emitted by the control emitter 5 reach the base. Because of the higher current density, the emitter time constants are smaller.

However, in the new transistor, the current density at the frequency $f_T$ can already be a multiple of the current density of a standard, conventional transistor. It is, for instance, possible to obtain a value 15 times higher than in conventional transistors. This value is even higher at lower frequencies.

The new transistor offers advantages also in switching applications. The current density can be multiplied many times as compared to the conventional transistor.

As compared to a thyristor, the transistor has the advantage that it can be switched on and off simply. Furthermore, an operating point just before reaching saturation can be adjusted in a transistor, whereby the switching time is substantially shortened.

Due to the greater current reserve, the new transistor can accommodate substantially larger current peaks without occurrence of the so-called "second breakdown."

The invention is not limited to the Examples of embodiments. In particular, the respective complementary transistors can also be realized. Instead of the wafer structure, Mesa and planar structures can, for instance, also be used. Furthermore, the different zones can have a doping gradient. The control emitter 5 need not be subdivided if the stability conditions described above can also be met with a continuous emitter.

The control of the novel transistors is achieved advantageously via the control emitter, while the output signal is taken off at the emitter 1. AC-wise, the collector layer 4 is here at ground potential. In principle, it is also possible to control the control emitter 5 and the base-emitter path 2, 1 simultaneously. In that case, it makes sense to subdivide also the emitter 1.

What is claimed is:

1. A continuously controllable transistor comprising a first emitter zone, a base zone, a collector zone and a second emitter zone successively superposed one on the other, a collector-base barrier layer disposed between said base zone and said collector zone, means for applying a voltage across said superposed zones with increased current density in the collector-base barrier layer, in which, when in operation, the ratio of the current of charged particles of one conductivity type ($i_1$), from the base zone to the collector zone, to the current of charged particles of the other conductivity type ($i_2$), from the collector zone to the base zone, approximately equals the ratio of the drift velocities of the particles of said one conductivity type and of said other conductivity type in the collector-base barrier layer.

2. The transistor of claim 1, including internal inherent regulation means therein for regulating the ratio of the two currents ($i_1$, $i_2$) so as to be approximately equal to the ratio of the drift velocities of said one conductivity type and of said other conductivity type.

3. The transistor of claim 2, including a control emitter zone emitting current of charged particles of said other conductivity type ($i_2$), said control emitter zone being located on the side of the collector zone remote from the base zone, and having a conductivity type which is the opposite of the conductivity type of the collector zone.

4. The transistor of claim 1, wherein the collector has a resistance that is so low that a collector current released by a control voltage applied to the collector produces, at the collector resistance, a voltage drop smaller than the amount of said control voltage.

5. The transistor of claim 4, wherein the voltage drop at the collector resistance is smaller than one-third of the control voltage.

6. The transistor of claim 1, wherein the base side of the collector-base barrier layer has a space charge zone having a combination center density greater than in regions surrounding the same.

7. A circuit arrangement for operating a continuously controllable transistor comprising a first emitter zone, a base zone, a collector zone and a second emitter zone successively superimposed one on the other, a collector-base barrier layer disposed between said base zone and said collector zone, means for applying a voltage across said superposed zones with increased current density in the collector-base barrier layer, in which, when in operation, the ratio of the current of charged particles of one conductivity type ($i_1$), from the base zone to the collector zone, to the current of charged particles of the other conductivity type ($i_2$), from the collector zone to the base zone, approximately equals the ratio of the drift velocities of the particles of said one conductivity type and other conductivity type in the collector-base barrier layer, said control emitter zone being actuable for controlling the transistor.

8. The circuit of claim 7, including means for taking off an output signal at the first emitter zone.

9. The circuit of claim 7 wherein the collector zone is AC wise at ground potential.

* * * * *